Oct. 26, 1965   C. P. DE BIASI   3,213,604
HYDRAULIC PROPULSION SYSTEM FOR VEHICLE OR THE LIKE
Filed Dec. 6, 1963   3 Sheets-Sheet 1

INVENTOR
Charles P. de Biasi

BY [signature]
ATTORNEY

Oct. 26, 1965     C. P. DE BIASI     3,213,604
HYDRAULIC PROPULSION SYSTEM FOR VEHICLE OR THE LIKE
Filed Dec. 6, 1963            3 Sheets-Sheet 2
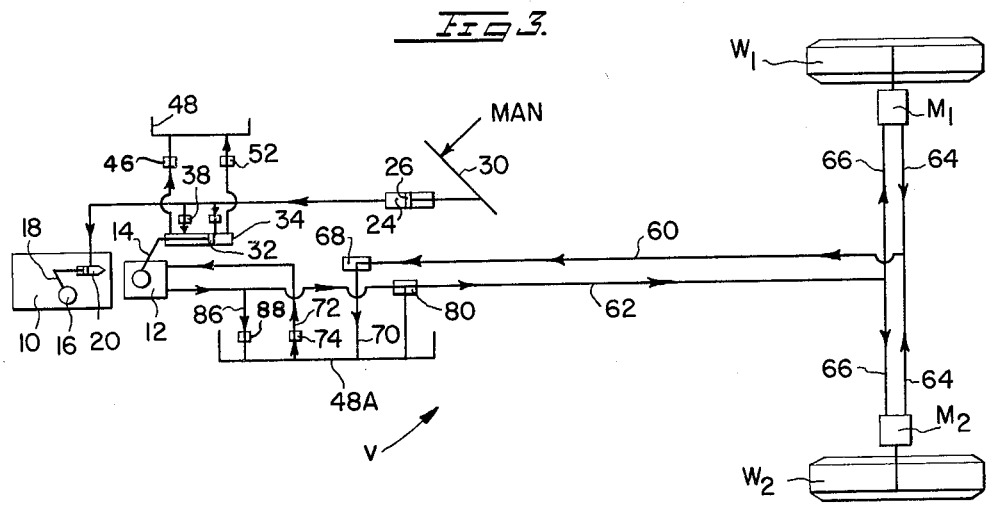
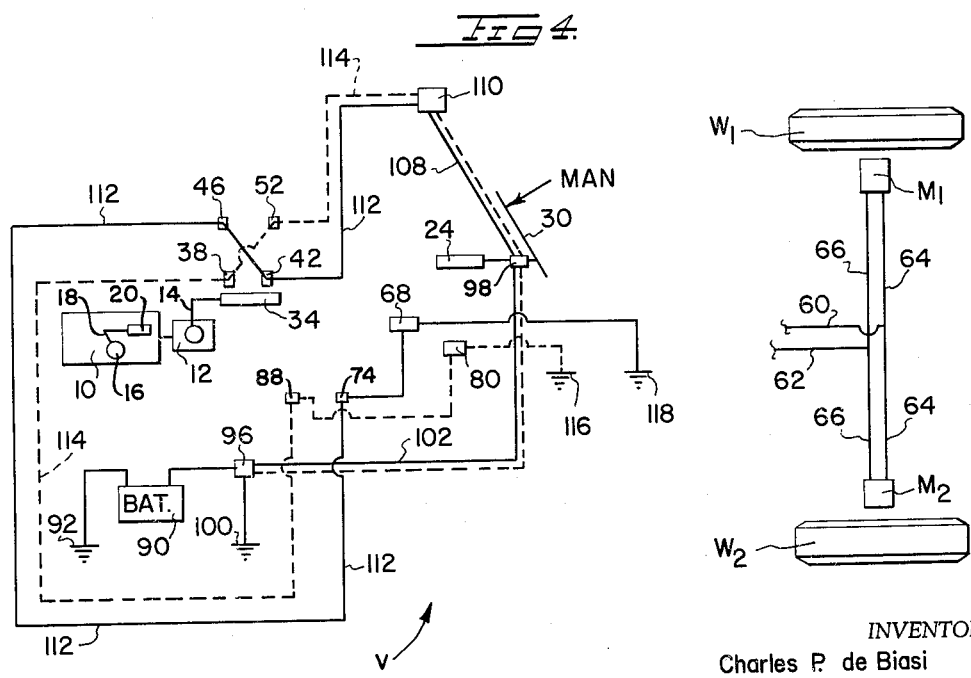
INVENTOR
Charles P. de Biasi
BY *Robert Neal Roley*
ATTORNEY Oct. 26, 1965 C. P. DE BIASI 3,213,604
HYDRAULIC PROPULSION SYSTEM FOR VEHICLE OR THE LIKE
Filed Dec. 6, 1963 3 Sheets-Sheet 3
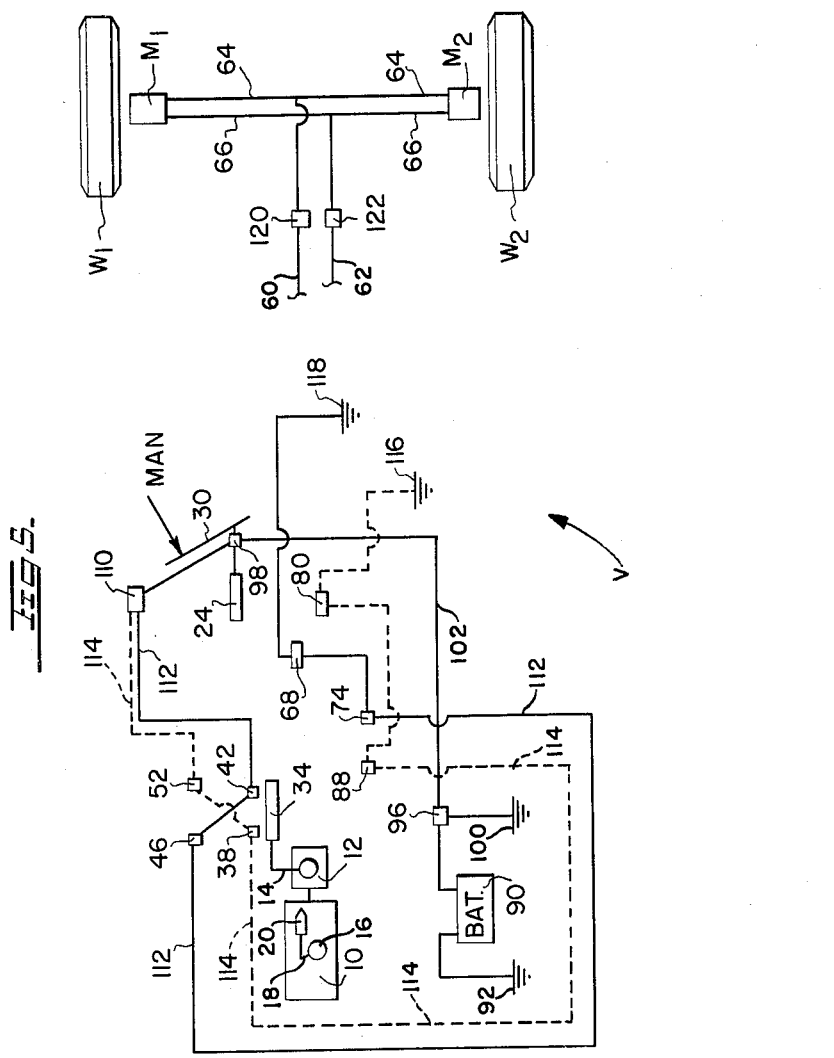
INVENTOR
Charles P. de Biasi
ATTORNEY United States Patent Office 3,213,604
Patented Oct. 26, 1965

3,213,604
HYDRAULIC PROPULSION SYSTEM FOR
VEHICLE OR THE LIKE
Charles P. de Biasi, 74 Braman Road, Waterford, Conn.
Filed Dec. 6, 1963, Ser. No. 328,709
18 Claims. (Cl. 60—19)

This invention relates generally to vehicle propulsion systems and is more particularly concerned with a novel fluid transmission system, arrangement, mechanism, apparatus and method adapted for propelling powered vehicles forwardly and in reverse whether such vehicle is movable on wheels, endless tracks, amphibious or of other types.

It is therefore a primary object of this invention to provide a multi-directional drive hydraulic transmission system, arrangement, mechanism, apparatus and method for a vehicle having hydraulic motor means driven by a reversible, variable displacement pump driven by the vehicle engine wherein both the pump and engine are both simultaneously under manual control and wherein the transmission is selectively directionally conditioned and responsive to an electric circuit comprising the ignition control circuit for the engine.

It is another object of this invention to provide a hydraulic transmission system, arrangement, mechanism, apparatus and method for propelling a vehicle having a propulsion engine driving a reversible flow hydraulic, variable displacement pump unit operable to drive propelling hydraulic motor means in either of two directions wherein the speed of the propulsion engine and the volume and direction of flow of hydraulic fluid to the hydraulic motor means are controlled simultaneously by common manually operable means.

A further object of this invention is to provide a hydraulic transmission system, arrangement, mechanism and apparatus for propelling a vehicle having a propulsion engine comprising throttle means and driving reversible flow and variable displacement pump means wherein directional flow control means is simultaneously and continuously actuated by manually operable fluid pressure means after the directional flow control is selectively pre-set.

A still further object of the invention is to provide a hydraulic transmission system, arrangement, mechanism and apparatus for propelling a vehicle comprising a propulsion engine, a variable displacement and reversible wobble plate type pump unit both simultaneously and commonly controlled by single manually operable means and manually pre-set electrical means for conditioning the direction of fluid flow through the hydraulic transmission system.

Yet still another object of this invention is to provide a vehicle propulsion engine having a throttle and driving hydraulic transmission system, mechanism, and apparatus comprising a reversible, variable displacement pump structure having flow reversing control means adjustable from a centered no-drive position to either forward or reverse drive positions with the vehicle engine throttle and pump control means being simultaneously actuated by manually operable means having fluid pressure creating means for driving hydraulic motor propelling means, and manually pre-settable electrical means conditioning the hydraulic transmission system for controlling the flow of hydraulic fluid therein.

An additional and still further object of this invention is to provide a vehicle having a propulsion engine driving a single, reversible-flow, adjustable wobble plate type pump structure driving a plurality of vehicle wheel propelling motors, said engine having speed throttle control means and said pump having a directional control and variable fluid displacement member, wherein the engine throttle control means and the pump variable fluid displacement member are commonly and simultaneously controlled by a manually operable accelerator pedal after initial manual displacement thereof and electrical circuit means of which the engine ignition control means forms a part including manually pre-settable switch means for adjusting the transmission system to provide either forward or reverse drive of fluid flow to the wheel propelling motors of the vehicle.

Another and still further object is to provide a vehicle variable speed propulsion engine directly driving a hydraulic transmission system, mechanism and apparatus having a reversible flow and variable displacement pump means driving vehicle wheel driving motors in either a forward or reverse direction wherein the system comprises electrically controlled valve means under manually operable switch control means for predetermining the direction of drive of the motors and further having a manually operable pedal actuating fluid servo means for simultaneously varying the speed of the engine and the output of the variable displacement pump after initial displacement of the pedal, together with means effecting hydraulic self-locking of the wheel driving motors when the manually operable pedal is returned to its unactuated position.

An additional and still further object of this invention is to provide a vehicle fluid transmission utilizing the variable speed propulsion engine of the vehicle to directly drive a variable displacement reversible hydraulic pump wherein the speed of the engine and the direction of and discharge of the pump are simultaneously controlled and wherein an electrical control circuit comprising the engine ignition circuit is employed to selectively condition and control the transmission for forward and reverse drive.

Other objects, advantages and important features of this invention will be apparent from a study of the specification following, taken with the drawing, which together describe, disclose, illustrate, and show certain embodiments of the invention and what is now considered and believed to be the best method of practicing the principles thereof. Still other embodiments, modifications, procedures or equivalents may occur to those having the benefit of the teaching herein and such other embodiments, modifications, procedures or equivalents are intended to be reserved especially as they fall within the scope and breadth of the subjoined claims.

In the drawing:

FIGURE 3 is a view similar to FIGURES 1 and 2 showing the hydraulic transmission components adjusted for reverse drive;

FIGURE 4 is a diagrammatic showing of electrical control circuits correlated to and controlling the vehicle hydraulic transmission system of FIGURES 1, 2 and 3 to effect both forward and reverse drive of the vehicle, and

FIGURE 5 is a diagramamtic showing, similar to FIGURE 4, of an arrangement incorporating electrical controlled self-braking features in the hydraulic transmission.

Figure 1:
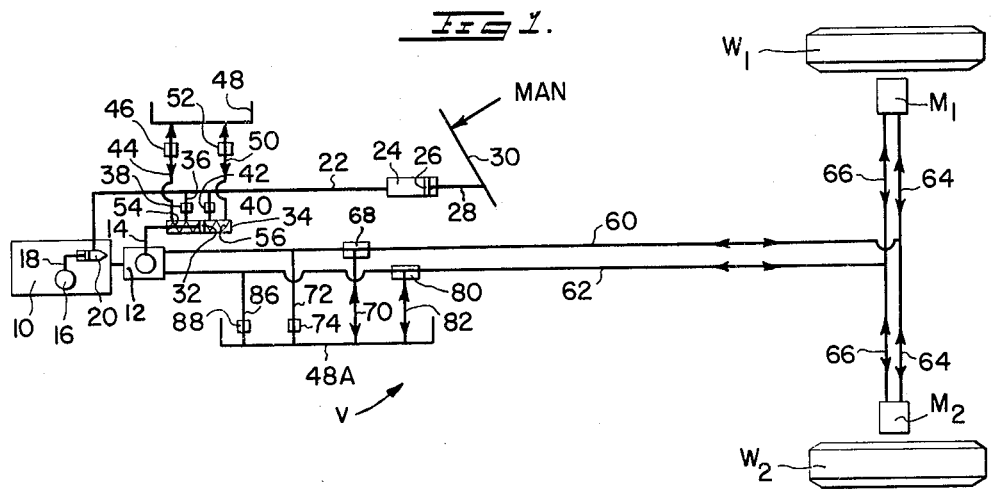
FIGURE 1 is a diagrammatic showing of a hydraulic drive transmission adapted, by way of example and for the sake of simplification, to a two-wheel drive vehicle with the hydraulic transmission components in non-drive and "free-wheeling" adjustment.
Figure 2:
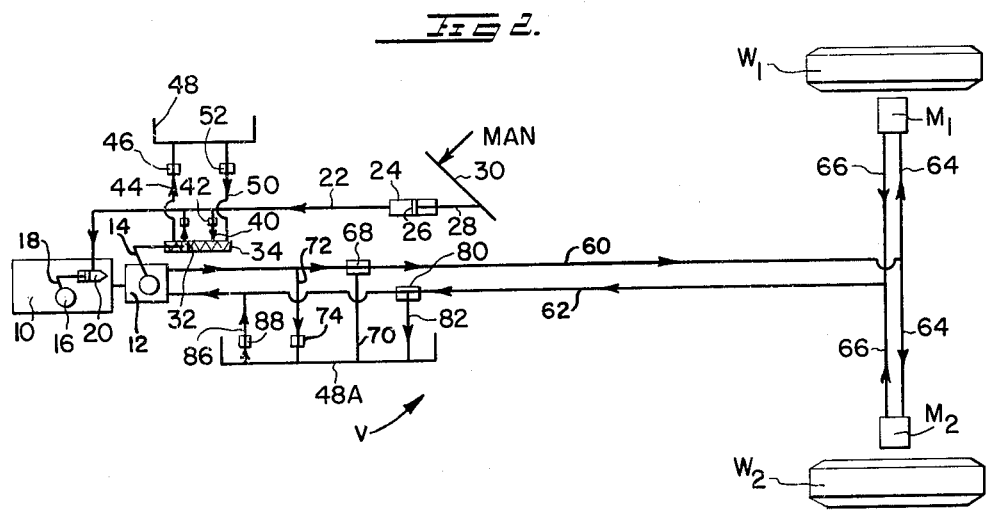
FIGURE 2 is a diagrammatic view similar to FIGURE 1 but showing the hydraulic transmission components adjusted for forward drive.

Attention is now directed to the showing in FIGURES 1 to 3 of the drawing wherein there is shown a vehicle V having a prime mover 10 which may be of any type, such as a conventional internal combustion engine, gas turbine or the like. The prime mover 10 directly drives through suitable coupling means a reversible, variable displacement hydraulic pump device 12 having variable displacement with reversing swash plate such as is now commercially available on the market and accordingly the details of which are not illustrated. The pump device 12 has a swash plate control lever 14 by which the angularity of the swash plate thereof (not shown) is hydraulically adjusted in two opposite directions from an intermediate neutral setting. The engine 10 has a carburetor 16 and a throttle control lever 18 connected by suitable linkage with a piston of an engine-mounted conventional hydraulic servo unit 20 hydraulically connected by conduit means 22 to a hydraulic pressure cylinder 24 having a piston 26 directly connected by suitable linkage 28 to a manually operable pivoted accelerator-control pedal 30 having a conventional return spring (not shown).

The hydraulically controlled swash plate control lever 14 is pivotally connected to a rod of a piston 32 of a hydraulic pressure or servo cylinder 34. Suitable centering springs 54 and 56 normally center the piston 32 in order that the pump control lever 14 may be returned to a centered, no-pumping position when the accelerator-control pedal 30 is manually released and returned to the initial engine-idling position thereof. Conduit means 36 having a solenoid-controlled open-close orifice valve 38 therein connects the forward end of the servo cylinder 34, relative to the engine 10, with the pressure conduit means 22 while corresponding conduit means 40 having a similar solenoid-controlled valve 42, connects the opposite or rear end of the cylinder 34 with the conduit means 22. Similarly, fluid supply conduit means 44 having a solenoid-actuated open-close valve 46 therein connects the forward end of the cylinder 34 with a hydraulic fluid reservoir 48 while conduit means 50, having a like solenoid-actuated valve 52, connects the rear or right end of cylinder 34 with the reservoir 48.

Each of the wheels W1 and W2 of the vehicle V has a hydraulic driving motor M1 and M2, respectively, directly associated therewith and preferably built into the wheel structure so as to comprise an integral component thereof. Connected between the pump 12 and the motors M1 and M2 are two separate hydraulic fluid conduit means 60 and 62 which extend from the two fluid flow passages of the pump 12 at one end and connect with two conduit means 64 and 66, respectively, at a point intermediate the length of the latter.

A two-way or directional fluid flow, solenoid-controlled valve 68 is located in the conduit means 60 intermediate the length thereof and branch conduit means 70 connects the valve 68 with an auxiliary reservoir 48A which actually comprises a part of the reservoir 48. Another conduit means 72 connects the reservoir 48A with the conduit means 60 intermediate the pump 12 and the valve 68, and has located therein a normally spring-opened solenoid-closed orifice valve 74. The other pump conduit means 62, corresponding to the conduit means 60, has located therein intermediate the length thereof, a similar two-way flow, solenoid-controlled valve 80 having branch conduit means 82 extending therefrom to the auxiliary reservoir 48A. Likewise, extending from the conduit means 62 intermediate the pump 12 and the valve 80 is branch conduit means 86 having a spring-opened, solenoid-closed valve 88 therein opening to the auxiliary reservoir 48A.

The electrical circuit for controlling the fluid transmission, as shown in FIGURE 4 with controlled components of the latter, comprises a conventional vehicle or electrical storage battery 90 having one terminal grounded at 92. Connected to the other battery terminal is a conductor 94 which is connected to the conventional engine ignition switch 96 and is grounded at 100. A conductor 102 in turn connects an ignition switch 96 with a master circuit controlling or limit switch 98 located adjacent and responsive to depression of the accelerator-transmission control pedal 30. A wire lead 108 connects the pedal-actuated master control switch 98 to a manually operable, double throw, neutral center, directional control or selector switch 110 which is pre-settable for conditioning the electrical circuitry for either forward or reverse drive from a mid-center, neutral or no-drive setting of the switch. It is to be understood that the directional-drive controlling switch 110 and the accelerator-transmission control pedal 30 are intended to be located in positions adjacent the operator of the vehicle V for convenience and ease of operation.

Also, shown connected with the manually operable double throw direction selector switch 110 in FIGURE 4 are two separate electrical branch leads 112 and 114. Connected in series in the electrical lead 112 are the solenoid actuators of the valves 42 and 46 in the hydraulic conduit means 40 and 44, respectively, connecting the power cylinder 34 at the respective rear and forward ends with the pressure conduit means 22 and the reservoir 48, respectively, for actuating the pump wobble plate control arm 14, together with the solenoid actuator of the valve 74 in the conduit means 72 connecting the pump conduit 60 with the auxiliary reservoir 48A, and the solenoid of the two-way fluid flow control valve 68 connecting the conduit means 60 to the reservoir, with the valve 68 being connected to ground at 114. Located in and arranged in series in the other branch electrical lead 114 which is connected with the manually operable double throw, directional selector switch 110, are the solenoid actuators of the valves 52 and 38 in the hydraulic conduit means connecting the rear and forward ends, respectively, of the power or servo cylinder 34 with the reservoir 48 and the pressure conduit means 22, respectively, together with the solenoid actuator of the valve 88 in the conduit means 86 connecting the pump conduit 62 with the auxiliary reservoir 48A, and the solenoid of the two-way fluid flow control valve 80 in the conduit means 62, with the valve 80 being connected to ground at 116.

It is to be noted that since all of the solenoid-actuated valves hereinabove referred to, whether of the single direction, spring-closed, solenoid-open or spring opened, solenoid-closed orifice type or the two-way position and directional type, are not illustrated in detail since they are all conventional, well known and readily available on the open market. The same is true of the various single throw and double throw switches employed in the control circuit and referred to hereinabove.

*Operation*

The manner in which the hydraulic transmission system of this invention functions is as follows.

Referring to FIGURE 4 of the drawing, the engine 10 of the vehicle V is first started in the usual manner by closing the ignition switch 96 to energize the conventional engine ignition system thereof (not shown) by means of the battery 90, the conductor 94, the switch 96 and the ground connections 92 and 100, the only portion of the circuitry in FIGURE 4 thus far actuated since the conventional two-way directional control switch 110 is in the neutral centered position of adjustment. Hence, under this condition the closure of the switch 98 by depression of the accelerator-control pedal 30 during engine warm-up will have no effect on the hydraulic transmission since the electric control circuit therefor is open or incomplete. At this time the electrical de-energized valves 38 and 42 at each end of the servo cylinder 34 are maintained closed by the respective closure springs thereby isolating the cylinder 34 from the pressure conduit 22. The piston 32 within the cylinder is centered by the springs 54 and 56 which maintain the swash plate of the pump in a neutral or no-pumping status.

Assuming that forward drive of the vehicle V is desired, the vehicle operator actuates the directional control and selector switch 110 from the neutral or centered position to the forward drive position prior to depression of the accelerator-control pedal 30. On initial manual depression of the pedal 30, the master control switch 98 is thereby actuated to closed position. Noting the now completed circuit shown in solid lines in FIGURE 4 of the drawing, electric current from the battery 90 flows through the conductors 94, 102 and 108, the ignition switch 96, the master switch 98 and through the directional switch 110 and thence into the conductor 112 connected to a forward drive terminal or connection of the switch 110. Actuation of the pedal 30 simultaneously actuates the piston 26 in the hydraulic pressure cylinder 24 to force hydraulic fluid therefrom into the pressure fluid conduit means 22 to actuate the engine-mounted servo cylinder-piston unit 20 to increase the engine speed by pivoting the engine throttle lever 18 in direct proportion to depression of the pedal 30.

The electric current, which now flows in the conductor 112 of the selected forward drive section of the circuit by way of the directional switch 110, energizes the spring-closed valve 42 to open position thereby placing the rear end of the cylinder 34 in communication with the hydraulic fluid in the pressure conduit means 22 as indicated in FIGURE 2. Since the valve 52 is spring closed at this time it cuts off the reservoir 48 from the rear end of the cylinder 34 and the fluid pressure, manually created in the cylinder 24 accordingly moves the piston 32 to the left in the servo cylinder 34 to move the wobble plate control lever 14 counterclockwise to effect a forward drive pumping action. Movement of the piston 32 is permitted to move to the left in cylinder 34, as described and shown in FIGURE 2, since the spring-closed valve 46 in the conduit means 44 connecting the forward end of cylinder 34 to the reservoir 48 is now open by the above-described energization of the solenoid to permit fluid flow from the forward end of cylinder 34 to the reservoir 48 even though the valve 38 in the conduit means 36 to the reservoir remains spring-closed. The spring-opened, solenoid-closed valve 74 in the branch conduit means 22 at this time stands closed by the energization of the solenoid thereby closing off the conduit means 60, the pressure discharge conduit means from the pump 12, and from the auxiliary reservoir 48A. Pressure fluid accordingly flows through the pump discharge conduit means 60 into the conduit means 64 and into each of the wheel motors M1 and M2 to drive the vehicle V forwardly, the return fluid from the motors flowing therefrom into the conduit means 66 and the rear portion of the conduit means 62 from which it flows via the energized two-way directional flow valve 80 and the branch conduit 82, into the auxiliary reservoir 48A. At this time the forward portion of the conduit means 62 adjacent the pump 12 become the fluid intake conduit means for the pump 12 from the auxiliary reservoir 48A and since the valve 88 in the branch conduit means 86 is maintained open by the spring, the solenoid therefor being de-energized at this time, the suction of the pump 12 draws fluid from the auxiliary reservoir 48A via the branch conduit means 86.

The greater the angle of depression of the accelerator-control pedal 30 the greater will be, in direct proportion thereto, the inclination of the swash plate of the pump 12 by the lever 14 to provide greater fluid discharge therefrom for increased speed of the motor driven vehicle wheels W1 and W2 and a simultaneous increase in the engine speed or horsepower output thereof through a correspondingly increased inclination of the throttle lever 18.

Should the operator fully release accelerator-control pedal a return spring (not shown) moves the pedal 30 clockwise and the piston 26 connected thereto towards the initial position (FIGURE 1) the servo piston 32 also being returned to the centered position by the centering springs 54, 56. Such movement of the pedal 30 and the piston 26 connected thereto can take place, inasmuch as the cylinder 32 is now under atmospheric pressure in view of the valves 42 and 46 being maintained open by the energized solenoids until the pedal 30 substantially or almost reaches the initial or rest position by reason of the master switch 98 remaining electrically closed up to that particular moment. On the opening of the switch 98 at the end of the final small increment of movement of the pedal 30 to the free or rest position the valves 42 and 46 then become de-energized and spring-seated to close the respective branch conduits 40 and 44 to pressure the conduit means 22 and the reservoir 48.

Return of the accelerator-control pedal to the rest position by the action of the servo cylinder springs 54, 56 and the pedal return spring accordingly returns the engine throttle lever 18 to the engine idling position and the pump wobble control lever 14 to the neutral, no-pumping position. Should the vehicle V be moving forward at this moment the wheel motors M1 and M2 then act as pumps to circulate fluid from the auxiliary reservoir 48A via the branch conduit means 70, the spring opened valve 68, the conduit means 60 to the motors and thence back to the auxiliary reservoir 48A via the conduit means 66 and 62, the spring opened valve 80 and the branch conduit means 82. Thus the vehicle V will in effect be "free-wheeling."

If the operator now desires to operate the vehicle V in reverse, he first actuates or flips the manually-operable directional control or selector switch 110 to the reverse drive position to electrically connect the branch conductor 114 thereto while the accelerator-control pedal 30 is in a released or engine-idling position corresponding to the showing in FIGURE 1. On initial depression of the pedal 30, which then initially closes the master control switch 98, the selected electric circuit via branch conductor 114, as shown in broken lines in FIGURE 4, now becomes energized to control the transmission for reverse drive in the manner indicated in FIGURE 3. With the closing of the master switch 98 initially by the pedal 30 the reverse drive electrical control portion of the circuit, from the battery 90 through the branch conductor 114 to the ground 116 is completed. It will be noted that both of the valves 52 and 38 are now maintained open by the solenoids while the valves 42 and 46, now out of the energized control circuit, remain closed by the respective springs. Hence, as indicated in FIGURE 3, the pressure in the manually actuated power cylinder 24 is transmitted to the forward end of the power cylinder 34, the front end of which is now closed off from the reservoir 48 by the value 46 while the rear end is open to the reservoir by the now open valve 52, as above noted. It is thus apparent that the pressure fluid in the conduit means 18 from the power cylinder 24 now reacts against the forward side of the piston 32 in the servo cylinder 34 to force same rearwardly, or to the right in FIGURE 3, while the pressure fluid in the conduit means simultaneously actuates the engine throttle lever 18 to increase the engine speed in direct proportion to the depression of the pedal 30. With the induced movement of the piston 32 in the servo cylinder 34 to the right in FIGURE 3 the wobble plate control lever 14 of the pump 12 is rotated clockwise to move the wobble plate thereof from a centered, no-pumping position to a rearward or reverse drive pumping position, the degree of which likewise depends on the extent of manual depression of the pedal 30.

With the variable displacement pump 12 adjusted for fluid displacement therein the conduit means 62 now becomes the pump discharge conduit. Since the valve 88 in the branch conduit means 86 to the auxiliary reservoir 48A is now maintained closed by the solenoid and the valve 74 in the branch conduit means 72 is maintained open by the spring, the pump 12 receives fluid from the auxiliary reservoir 48A via the branch conduit means 72 and the pump intake forward portion of the conduit means 60. Since electrical energization of the two-way directional solenoid-controlled valve 80 in the pump discharge-conduit means 62 has been positioned for straight line fluid flow therethrough, as shown in FIGURE 3, and the concurrent energization of the two-way flow solenoid controlled valve 68 in the conduit means 60 is now adjusted at right angle for fluid flow to the auxiliary reservoir 48A from the conduit means 60 it is clearly apparent that the fluid flows from the pump 12 to the wheel motors M1 and M2 via the conduit means 62 and 66 and returns to the auxiliary reservoir 48A via the conduit means 64, 60 and 70.

It is thus apparent from the above description and disclosure that the hydraulic transmission of this invention and the engine of the vehicle with which it is employed are both very simply controlled solely by operation of the accelerator-control pedal 30 in conjunction with the manually controlled directional switch 110 to secure the forward drive, reverse drive and neutral or no-drive conditions of the disclosed hydraulic drive transmission system.

In FIGURE 5 of the drawing, there is shown a modification wherein the transmission system incorporates means to render same self-braking, and arrangement highly desirable for certain types of powered vehicles, such as bulldozers, etc.

The hydraulic transmission system of FIGURE 5 is identical in all respects with the system disclosed in FIGURES 1–4 but in addition thereto comprises two solenoid-opened, spring-closed orifice valves 120 and 122, the valve 120 being located in the pump conduit means 60 intermediate the auxiliary reservoir 48A and the wheel motor conduit means 64 and the other valve 122 correspondingly positioned in the pump conduit means 62 intermediate the auxiliary reservoir 48A and the wheel motor conduit means 66. In the electrical circuitry, as shown in FIGURE 5, the valves are connected in series relation in the conductor 102 between the ignition switch 96 and the pedal-actuated limit switch 98 in order that they will be energized whenever the directional two-way control switch 110 is actuated for either forward or reverse drive and either circuit is closed by the limit switch 98 after the pedal 30 is initially actuated.

In the operation of this arrangement it is apparent that whenever the accelerator-control pedal 30 is initially depressed, after the directional switch 110 is first adjusted for either forward or reverse drive from the mid center no-drive position, the normally spring-closed valves 120 and 122 in the pump conduit means 60 and 62 are opened by the solenoid actuators, along with the actuation of the other solenoid valves, above described, and held open so long as the pedal 30 is maintained depressed by the operator. The flow of hydraulic fluid to and from the wheel motors M1, M2 occurring at this time is precisely the same as described relative to FIGURES 1–4. However, as soon as the operator releases the accelerator-control pedal 30 to return fully to the initial rest or engine-idling position the master control switch 98 becomes de-energized. As a result the solenoid actuators of the valves 120 and 122 in the pump conduit means 60 and 62, along with other corresponding solenoid valves above described, become electrically de-energized. Thus, any tendency for the wheels W1, W2 to rotate and drive the motors M1, M2 as pump units is prevented by the blockage of hydraulic fluid in the motors and in the conduit means 64, 66, the portions of the pump conduit means 60, 62 between the valves 120, 122 and the motor connecting conduit means 64, 66 by the now permitted closure of the valves 120 and 122 by the respective spring means.

While the invention has been described, disclosed, illustrated and shown in terms of certain preferred embodiments or modifications which it has assumed in practice the scope of the invention should not be deemed to be limited by the precise certain embodiments or modifications herein shown, described, illustrated and disclosed, such other embodiments or modifications being intended to be reserved as they fall within the scope of the claims hereto appended.

I claim as my invention:

1. A hydraulic drive transmission for vehicles comprising in combination with a prime mover,
   a reversible variable displacement pump driven by said prime mover,
   fluid pressure means for simultaneously controlling said prime mover and said reversible variable displacement pump,
   first control means to actuate said fluid pressure means,
   hydraulic motor means driven by said pump,
   reservoir means,
   conduit means connecting said reservoir means with said pump, the motor means and said fluid pressure means,
   power responsive valve means in part of said conduit means for determining the direction of fluid flow therethrough,
   power means for energizing said power responsive valve means in said conduit means,
   said power means comprising means for selectively controlling said fluid flow determining valve means in said conduit means, and
   means responsive to initial actuation of said first control means operative to energize said power means.

2. A hydraulic drive transmission as defined in claim 1 wherein
   said prime mover comprises throttle control lever means,
   said reversible variable displacement pump comprises control lever means and
   fluid pressure jack means having a piston therein connected to said throttle control lever means,
   said fluid pressure means comprises a fluid pressure servo cylinder having movable piston means therein connected to said pump control lever means,
   a fluid pressure creating unit hydraulically connected to said servo cylinder and said jack means,
   second control means mechanically connected to said fluid pressure creating unit to develop fluid pressure therein,
   conduit means interconnecting said jack means and said fluid pressure unit and
   a pair of ducts separately connecting each end of said servo cylinder with said last mentioned conduit means and said reservoir means, and
   said power responsive valve means comprises a valve mounted in each duct of each of said pairs of ducts at each end of said servo cylinder.

3. A hydraulic drive transmission as defined in claim 2 wherein
   said reversible variable displacement pump is of the wobble plate type wherein said control lever means therefor is adjustable from a mid, no-pumping adjustment position to variable forward or reverse pumping positions by said first control means,
   said power means comprises an electrical circuit having a source of electrical energy, and
   said power responsive valve means comprises a plurality of solenoid actuated valves connected in said electrical circuit.

4. A hydraulic drive transmission as defined in claim 3 wherein said first control means comprises a pivoted control pedal, said means responsive to initial actuation of said pivoted control pedal comprises a master electrical circuit make-and-break switch, said means for selectively controlling said fluid flow determining valve means in said conduit means comprises a manually operable two opposite position, neutral-center switch means, said last mentioned means being manually pre-set prior to initial actuation of said pivoted control pedal to condition the hydraulic transmission system to attain either forward or reverse drive.

5. A hydraulic drive transmission as defined in claim 4 wherein said pedal actuated master switch and said selective fluid flow controlling switch means are connected in series relation in said electrical circuit, and said electrical circuit comprises two grounded branch portions connected with said selective fluid flow controlling switch means whereby one of said two branch circuit portions is cut out of the control circuit when said selective fluid flow controlling switch means is in either one of the two positions, one each of said pair of solenoid actuated valves and each end of said servo cylinder being connected in series in each of said two grounded branch circuit portions whereby when said pivoted control pedal is operated after said selective fluid flow controlling switch means is adjusted to either of the two positions said servo piston is moved in either of two directions to correspondingly move said pump control lever means to effect fluid discharge from said pump in either of two directions.

6. A hydraulic drive transmission system for vehicles comprising in combination a propulsion engine having a throttle control, a reversible, variable displacement pump having reversible intake and discharge ports driven by said engine and having a control, a fluid pressure unit for operating said engine throttle control, a fluid pressure servo unit for operating said pump control, fluid pressure means connected in parallel with both said fluid pressure and servo units, hydraulic motor means having intake and discharge ports driven by said reversible variable displacement motor means, fluid reservoir means, conduit means connecting said pump and motor ports and said fluid pressure servo unit with said reservoir means, electrically controlled valve means in said conduit means for directionally controlling fluid flow therethrough, an electrical control circuit comprising switch means for controlling actuation of said electrically controlled valve means in said conduit means, and means for electrically powering said electrical control circuit, said electrical circuit comprising ignition switch means for said engine disposed in parallel relationship with said controlling switch means.

7. A hydraulic drive transmission system for vehicles as defined in claim 6 comprising a pivoted control member for operating said fluid pressure means, said electrical circuit control switch means comprising a master circuit controlling switch closed by and during the initial actuation of said pivoted control member, said electrical circuit control switch means further comprising a pre-settable two-directional neutral center switch means for selectively conditioning said electrically actuated valve means for effecting either forward, reverse or no drive by the hydraulic transmission system.

8. A hydraulic drive transmission system for vehicles as defined in claim 7, wherein said electrical controlling circuit comprises a single grounded conductor portion and a grounded dual conductor portion, said single grounded conductor portion comprises said means for electrically powering said electrical circuit, said engine ignition switch and said master circuit controlling switch means whereby the engine ignition circuit may remain closed regardless of the operating status of the hydraulic transmission system.

9. A hydraulic transmission system for vehicles as defined in claim 8 wherein said pre-settable two-directional neutral center switch means for selectively conditioning said electrically actuated valve means connects said single conductor portion of said electrical control circuit with said dual conductor portion thereof, and said power source comprises electrical storage battery means.

10. A hydraulic transmission system for vehicles as defined in claim 9 wherein said driven hydraulic motor means comprises at least one positive displacement motor for propelling drive wheel means of the vehicle, and means interposed in said conduit means between said pump and motor responsive to the static initial position of said pivoted control member effective to cause said motor means to function as brake means.

11. A hydraulic drive transmission system for propelling a vehicle in a forward or reverse direction comprising, in combination, a propulsion engine having a throttle control, a reversible variable displacement hydraulic pump having a control for changing the direction and volume of flow of hydraulic fluid to and from said pump, hydraulic fixed-displacement motor means, hydraulic fluid reservoir means, control means comprising a hydraulic servo motor for operating said pump control, said control means being operative to simultaneously actuate said engine throttle control and said pump control to control the speed of said engine and said pump, conduit means connecting said pump, the motor means and the servo motor to said reservoir means, electrically responsive valve means in said conduit means, and electric circuit means comprising a source of electrical energy for controlling fluid flow through said valve means in said conduit means in at least one direction, said electric control circuit means having directional switch means adjustable from a neutral no-flow control position to selectively condition the electrically responsive valve means to effect a reversal of fluid flow between the pump and motor means to provide forward and reverse drive of the vehicle, said electric circuit also having master control switch means operated by the initial actuation of said control means to energize said electrically responsive valve means to effect a reversal of flud flow between the pump and motor means to provide forward and reverse drive of the vehicle, said electric circuit also having master control switch means operated by the initial actuation of said control means to energize said electrically responsive valve means in said conduit means to render said hydraulic transmission operative for either forward or reverse drive.

12. A hydraulic drive transmission system as defined in claim 11 wherein
said conduit means comprises separate fluid flow conduit means connecting said pump and said motor means,
branch conduit means connecting each of said separate conduit means with said reservoir means,
said electrically responsive valve means comprises a pair of two-directional valve structures each connecting one of said branch conduit means with each of said separate conduit means,
both of said pair of electrically responsive valve structures normally maintaining open communication between said motor means and said reservoir means when said directional switch means is in neutral adjustment whereby
said control means may be operated to vary the speed of said engine without transmission of torque therefrom to said motor means.

13. A hydraulic drive transmission system as defined in claim 11 wherein
said electrical control circuit comprises a single grounded conductor portion and a grounded two-conductor portion,
said directional switch means being operatively connected to both said circuit portions,
said source of electrical energy and said master control switch means comprises portions of said single grounded conductor portion and the engine ignition switch means is part of the single conductor portion of said electrical control circuit.

14. A hydraulic drive transmission system as defined in claim 11 wherein
said control means further comprises a pedal-actuated hydraulic jack means and an engine throttle actuating fluid pressure unit,
pressure fluid conduit means connecting said hydraulic jack means with said pump control servo motor and said engine throttle actuating fluid pressure unit,
said conduit means comprises a pair of conduits connecting each end of said pump control servo motor with said pressure fluid conduit means and said reservoir means, respectively,
said electrically responsive valve means comprises a normally spring-closed, solenoid-opened valve in each of said pairs of conduits,
said electrical control circuit comprises a grounded single conductor portion containing said source of electrical energy and a grounded two-conductor portion,
said directional switch means connecting said circuit two-conductor portion with said grounded single conductor portion thereof,
each of said grounded two-conductor circuit portions connecting the electrical actuators of a pair of pressure conduit connecting and reservoir connecting valves at opposite ends of said hydraulic servo motor,
each respective pair of said valves comprising portions of said electrically responsive valve means permitting fluid flow therethrough when either conductor of said two-conductor circuit portion is electrically energized.

15. A hydraulic drive transmission comprising in combination with an engine having throttle means,
a reversible variable displacement pump driven by said engine and having means for reversing and varying the discharge of hydraulic fluid therefrom;
fluid reservoir means connected to said pump,
hydraulic motor means driven by fluid discharged from said pump,
servo means connected to each of said pump reversing and discharge varying means and said engine throttle for actuation thereof,
fluid pressure control means operative to effect simultaneous actuation of said engine throttle and said pump reversing and discharge varying means,
conduit means connecting said pump servo means, pump and said hydraulic motor means with said reservoir means,
electrically responsive valve means in said conduit means directionally controlling the flow of fluid therein between said pump, said hydraulic motor means and said servo means with said reservoir means,
an electric control circuit having a source of electricity for said electrically responsive valve means,
said electric control circuit comprising switch means for effecting selection of said valve means for directional flow of hydraulic fluid through said conduit means to provide either forward or reverse hydraulic drive of said hydraulic motor means by said pump,
said fluid pressure control means comprising an accelerator-transmission control pedal connected to said servo means for actuation thereof, and
switch means actuated by initial actuation of said control pedal to effect electrical energization of said electrical circuit to render said transmission operative.

16. A hydraulic drive transmission comprising in combination with a prime mover having throttle means,
reversible variable displacement pump means driven by said prime mover and having a member operable to effect variable pumping displacement of said pump in either of two selective directions,
motor means hydraulically driven by said pump means,
fluid pressure control means operable for actuating said throttle means and said pump member,
hydraulic fluid reservoir means,
conduit means connecting said pump means, motor means and said fluid pressure control means with said reservoir means for conducting hydraulic fluid to and from said pump means, said motor means and said manually operable fluid pressure means,
valve means in said conduit means, and
an electrical control circuit having switch means to actuate said valve means to control the direction of flow of hydraulic fluid in said conduit means to obtain forward or reverse drive of said hydraulically driven motor means,
said electrical control circuit comprising ignition control means for said prime mover.

17. A fluid transmission adapted for propelling a vehicle comprising in combination
engine means having speed control means,
hydraulic circuit means comprising a variable speed reversible pump, motor means and fluid reservoir means having hydraulic connections therebetween,
said reversible pump having means to directionally control and vary the output thereof,
hydraulic means to simultaneously variably actuate said engine and said pump control means,
control means to operate said hydraulic means,
said hydraulic connections having electrically controlled valve means therein to control fluid flow therethrough,
an electric ignition control circuit for said engine means,
said electric control circuit having electrical connections to said electrically controlled valve means, and
switch means in said electric control circuit for controlling said electrically controlled valves to directionally control the flow of hydraulic fluid therethrough,
said switch means having a circuit master control switch operable by said control means after initial actuation thereof.

18. A fluid transmission as defined in claim 17 wherein said switch means comprises a second switch in series with said circuit master control switch, said second switch being pre-settable to pre-determine the direction of flow of hydraulic fluid through said hydraulic circuit means for selective conditioning of said electrically controlled valve means to provide for forward or reverse drive of the vehicle by said motor means.

References Cited by the Examiner
UNITED STATES PATENTS

| | | | |
|---|---|---|---|
| 2,774,436 | 12/56 | Ferris | 60—19 X |
| 2,976,685 | 3/61 | Thoma et al. | 60—19 X |
| 3,003,309 | 10/61 | Bowers et al. | 60—53 |

JULIUS E. WEST, *Primary Examiner.*

EDGAR W. GEOGHEGAN, *Examiner.*